3,483,881
SUPERSONIC INTAKE FOR A JET
PROPULSION ENGINE
Malcolm Roy Pike, Nottingham, and Stephen Lawrence
Bragg, Findern, England, assignors to Rolls-Royce Limited, Derby, Derbyshire, England, a British company
Filed Feb. 19, 1968, Ser. No. 706,346
Claims priority, application Great Britain, Mar. 9, 1967, 11,217/67
Int. Cl. F02k 7/10
U.S. Cl. 137—15.2         6 Claims

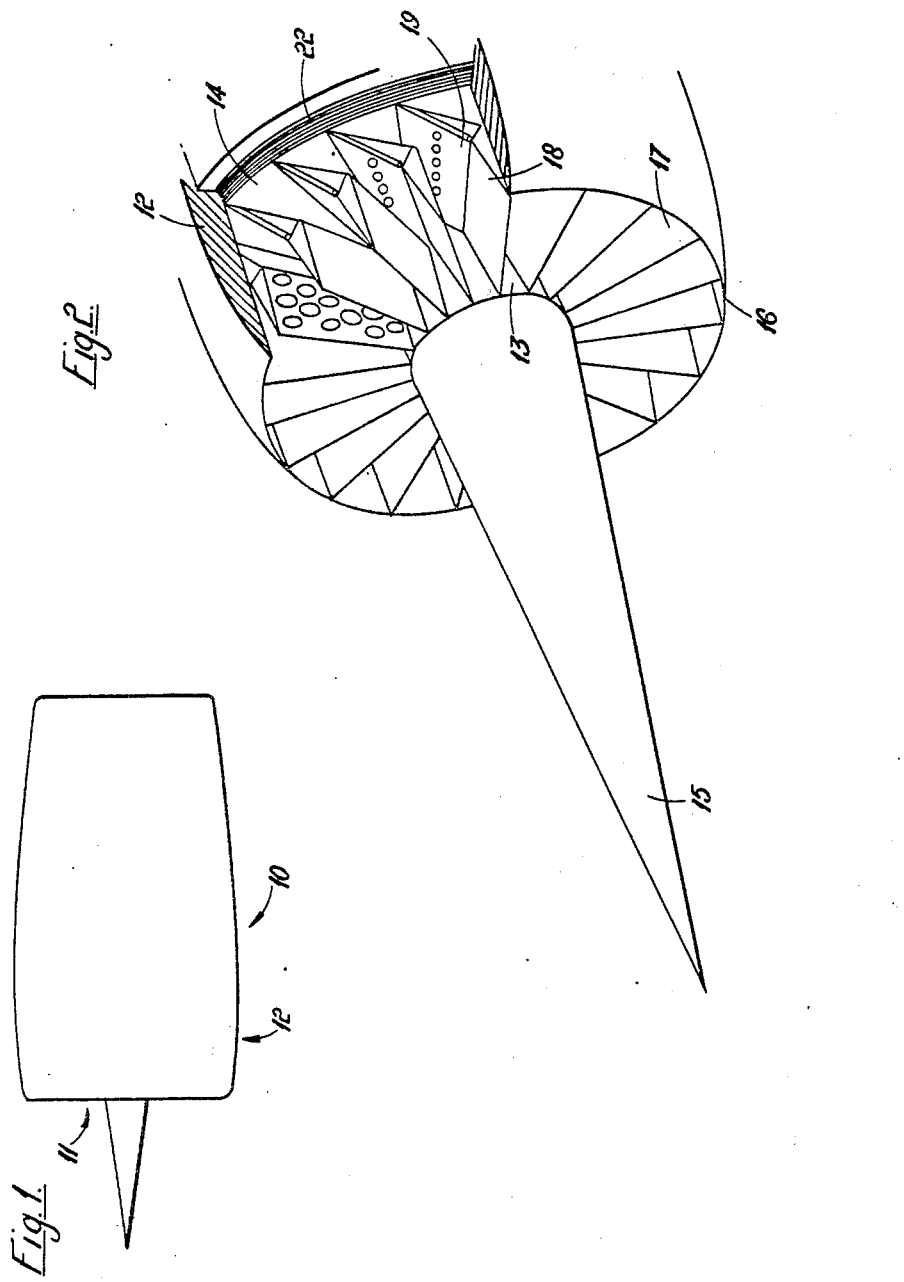

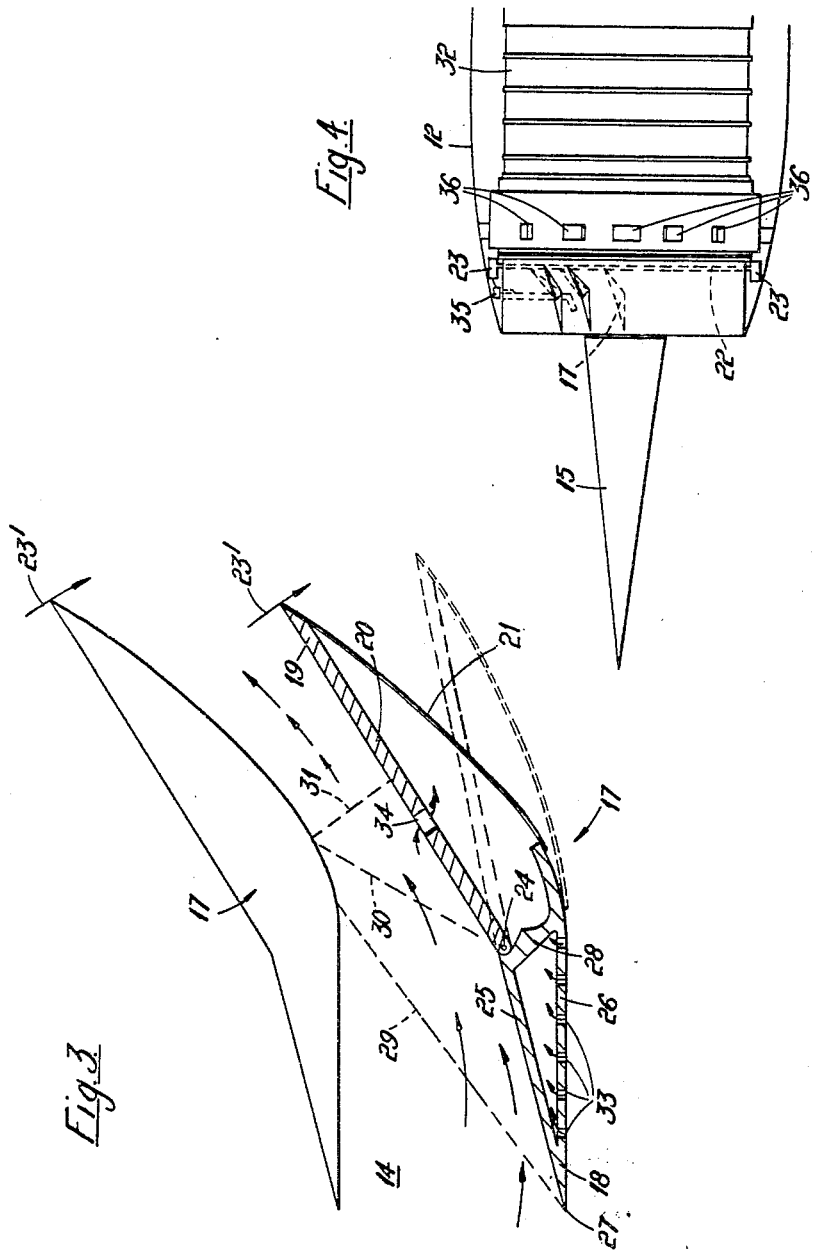

ABSTRACT OF THE DISCLOSURE

The invention concerns a supersonic intake for a jet engine comprising an outer casing having a fixed structure mounted therein which defines therewith an annular intake duct, a forwardly extending spike mounted in the fixed structure and a plurality of radially extending vanes mounted within the outer casing, the vanes defining an intake throat between each other. Each vane includes a fixed part, and a movable part pivotally movable in a circumferential direction relative to the fixed part, and ram means for moving the movable parts to vary the area of the intake throat.

---

This invention relates to supersonic intakes for jet propulsion engines, and although it is not so restricted, it will be described with reference to a gas turbine jet propulsion engine.

The present invention seeks to provide means for varying the cross-sectional area and internal shape of the intake so as to achieve efficient compression of ram air at varying speeds of flight, and to reduce the axial length of such intakes.

According to the present invention, there is provided a supersonic intake for a jet propulsion engine comprising an outer casing, a fixed structure mounted within said outer casing so as to define therewith an annular intake duct, a spike mounted on said fixed structure and extending forwardly thereof, a plurality of angularly spaced apart substantially radially extending vanes mounted adjacent the upstream end of said outer casing, the said vanes defining an intake throat between each other, each said vane including a fixed part and a movable part, each movable part being mounted for pivotal movement in a circumferential direction relative to its respective fixed part and including a first wall pivotally connected to a wall of said fixed part, and a second wall which is flexible and which is connected to the circumferentially opposite wall of said fixed part, there being means for moving at least some of said movable parts so as to vary the area of said intake throat.

The said intake throat is preferably defined between the fixed part of one vane and the movable part of the circumferentially adjacent vane, and preferably the fixed and movable parts of each pair of adjacent vanes respectively define flow passages therebetween which are at an angle to each other.

Each said vane may be hollow, the said fixed and movable parts thereof being separated from each other by a radial wall.

A wall of each said fixed part may be provided with at least one bleed slot, and additionally a wall of each said movable part may be provided with at least one bleed slot, for boundary layer control.

Preferably said at least one bleed slot in said movable part is arranged to be adjacent to where, in operation, a normal shock wave is located.

In a preferred embodiment, pressure sensing means are provided adjacent said intake throat, said sensing means being arranged to control the means for moving the movable parts of said vanes so as to tend to maintain the intake throat area at its optimum value.

The means for moving the said movable part may include a ram-actuated ring to which the said movable parts are connected.

A plurality of bleed orifices are preferably provided in said intake duct downstream of said vanes, and the opening and closing of said bleed orifices may be controlled by said pressure sensing means.

The invention also includes a jet propulsion engine provided with a supersonic intake as set forth above.

Preferably in operation the normal shock wave is arranged to be downstream of said throat and adjacent thereto.

Preferably the engine is a gas turbine engine and air from said intake passes to the first rotor stage of a compressor of the engine, there being no intermediate blading between said first rotor stage and said vanes.

Said bleed orifices may be located axially between said vanes and said first rotor stage.

The invention is illustrated, merely by way of example, in the accompanying drawings, in which:

FIGURE 1 is a diagrammatic side elevation of a jet propulsion engine provided with a supersonic intake according to the present invention;

FIGURE 2 is a perspective view, partially cut away, of the supersonic intake of the jet propulsion engine shown in FIGURE 1;

FIGURE 3 is a developed view, partly in section, of two adjacent vanes forming part of the supersonic intake of the present invention, and FIGURE 4 is a diagrammatic view, partly in section and partly in elevation, of part of the jet propulsion engine of FIGURE 1.

FIGURE 1 shows a supersonic gas turbine jet propulsion engine 10 having an air intake 11 and an outer casing 12.

The engine 10 has a fixed centre body 13 mounted within the outer casing 12 which defines an annular intake duct 14 therebetween (see FIGURE 2). The centre body 13 is provided with a coaxially disposed substantially conical spike 15 which extends forwardly—i.e. to the left in FIGURE 2—of the upstream end or lip 16 of the outer casing 12. The spike 15, when mounted on an aircraft which is flying at supersonic speeds, will generate an external conical shock wave in the well-known manner, at the design flight speed, the external shock wave (not shown) being aranged to extend between the tip of the spike 15 and the intake lip 16.

Mounted on the centre body 13 just downstream of the intake lip, a row of angularly spaced apart substantially radially extending stator vanes 17 is provided. As can be seen in FIGURES 2 and 3, each vane 17 comprises an upstream, fixed part 18 and a downstream, movable part 19. The parts 19 are connected to the fixed parts 18 by means of a hinged wall 20 pivoted at 24 and a flexible wall 21 are circumferentially opposite sides to each other.

The radially outer ends of the movable parts 19 are connected to a ring 22 which is rotatable by means of rams 23. Thus on actuation of the rams 23 the movable parts 19 will rotate about their respective pivots 24 from the full line position to the dotted line position shown by arrows 23' in FIGURE 3. It will be observed that in the full line position the flexible wall 21 is bowed.

The fixed parts 18 comprise two walls 25, 26 which converge in the upstream direction to provide a leading edge 27, while their downstream ends are connected by a substantially radially extending fixed wall 28. The fixed and movable parts 18, 19 are both hollow and the wall 28 serves to separate them.

It will be noted that in the flow passages defined between pairs of adjacent vanes 17 an intake throat is formed, the intake throat being in a plane extending perpendicularly to the wall 20 of one vane 17 and intersecting the adjacent vane at the edge formed by the intersection of walls 21 and 26. It will thus be appreciated that on rotation of the movable parts 19 from their full line position to their dotted line position, the area of the intake throat will be increased.

A further point to note is that the flow passages defined between walls 25, 26 of adjacent vanes on the one hand, and the flow passages defined between walls 20, 21 of adjacent vanes on the other hand are at an angle to each other. Thus in operation the air passing through the intake duct 14 between pairs of adjacent vanes 17 will be given a whirl leaving only a component of the air velocity in the axial direction. The flow direction is indicated by arrows in FIGURE 3.

Moreover, each flow passage defined between wall 20 of one vane and wall 21 circumferentially adjacent vane is of a diverging cross section in a downstream direction and thus said passages act as a plurality of short diffusers.

FIGURE 3 shows, in dotted lines, the positions of the shock waves which will, in operation, be formed in the intake duct 14. As can be seen, two oblique shocks 29, 30 will extend from the leading edge 27 to the throat. However, it will be understood that a different number of shock waves could be provided e.g. by arranging walls 25, 34 to be continuously arcuate.

It will be appreciated that the present invention provides a number of advantages over known intakes of variable size centre body type. In both cases, in supersonic flight, the air is slowed down first by passing through one or more external shock waves, but in the present invention the further slowing down and compression of the air is achieved by the variable stator vanes 17 which form a large number of diffusers, one diffuser between each pair of vanes 17. The axial distance required to achieve a given diffusion is considerably shorter when a large number of small diffusers are used and thus the present invention saves space and weight.

Furthermore, since the stator vanes 17 impart a whirl to the air, it is not necessary further to turn the air and thus compressor 32 (FIGURE 4) will not need any inlet guide vanes. Thus flow compression is achieved with very little flow turning and the flow is retarded to design rotor entry velocity in a very short distance.

In order to maintain the intake 11 of the present invention at a high efficiency over a large range of operating conditions, a number of control systems described below are provided.

As was mentioned above, both the fixed and the movable parts 18, 19 of each vane 17 are hollow and are separated by a wall 28. The reason for this is to provide means for boundary layer control around each vane 17. Thus in each of the walls 26 of the fixed parts 18, a plurality of bleed slots 33 are provided through which air may be sucked inwards (by means not shown). Similarly, each of the walls 20 of the movable parts 19 is provided with a bleed slot 34 through which air may be sucked inwards (by means not shown). Owing to the shock wave 30 extending between the slots 33, 34, the bleeds are at a different pressure and must be ducted away separately; hence the provision of the separating wall 28.

A further control system is provided to maintain the shock waves at the design position. To this end a pressure sensing system 35 and a ring of angularly spaced apart bleed ports 36 (FIGURE 4) are provided.

The pressure sensing system 35 is arranged to control actuation of the rams 23 and its probe (or probes) is located adjacent the intake throat.

The bleed ports 36 are located downstream of the stator vanes 17 but upstream of the compressor 32 and their opening and closing is also controlled by signals derived from the pressure sensing system 35. The bleed ports 36 communicate with the atmosphere.

If the intake should "unstart," i.e., the internal shock waves are expelled, due to e.g. a sudden change in the attitude of the aircraft in which the intake is mounted, the pressure sensing system 35 will detect the resulting pressure change, and provide a suitable signal which will rapidly open the bleed ports 36. The signal will also actuate rams 23 which in turn move ring 22 to rotate the movable parts 19 in the sense of increasing the intake throat area. When the intake throat area reaches a certain magnitude, the shock waves will be "swallowed" again and the design conditions will be re-established. The presure sensing system 35 will sense the intake "re-start" and will actuate the rams 23 and ring 22 to decrease the intake throat area to its correct value, and at the same time the bleed ports 36 will also be gradually closed, until the pressure sensitive system 35 indicates that the intake 11 is once again operating critically.

The excess air leaving through bleed ports 36 is dumped overboard.

A number of modifications may be effected within the scope of the present invention.

Thus, while in the described preferred embodiment each vane 17 is connected to the ring 22, in some cases it may be arranged that only some selected vanes, e.g. every alternate vane, are so connected. The intake throat could be defined between the walls 20, 21 of adjacent vanes, and to vary the throat area, the adjacent vanes would be given different amounts of rotation.

We claim:
1. A supersonic intake for a jet propulsion engine comprising: an outer casing, a fixed structure mounted within said outer casing so as to define therewith an annnular intake duct; a spike mounted on said fixed structure and extending forwardly thereof; a plurality of angularly spaced apart substantially radially extending vanes mounted adjacent the upstream end of said outer casing, said vanes defining an intake throat between each other, each said vane including a fixed part and a movable part, each movable part being mounted for pivotaly movement in a circumferential direction relative to its respective fixed part and including a first wall pivotally connected to a wall of said fixed part, and a second wall which is flexible and which is connected to the circumferentially opposite wall of said fixed part; and means for moving at least some of said movable parts so as to vary the area of said intake throat.

2. An intake as claimed in claim 1 wherein the said intake throat is defined between the fixed part of one vane and the movable part of the circumferentially adjacent vane, the fixed and movable parts of each pair of adjacent vanes respectively defining flow passages therebetween which flow passages are at an angle to each other.

3. An intake as claimed in claim 2 wherein at least one bleed slot is defined in a wall of each said movable part for boundary layer control, said at least one bleed slot in said movable part being arranged to be adjacent to where, in operation, a normal shock wave is located.

4. An intake as claimed in claim 1 wherein pressure sensing means are provided adjacent said intake throat, said sensing means being arranged to control the means for moving the movable parts of said vanes so as to tend to maintain the intake throat area at its optimum value.

5. An intake as claimed in claim 4 wherein a plurality of open and closeable bleed orifices are provided in said intake duct downstream of said vanes, the opening and closing of said bleed orifices being controlled by said pressure sensing means.

6. An intake as claimed in claim 1 in which in operation, has a normal shock wave arranged to be downstream of said throat.

References Cited

UNITED STATES PATENTS

| | | |
|---|---|---|
| 2,806,350 | 9/1957 | Hoffman. |
| 2,819,732 | 1/1958 | Paetz _____ 138—46 |
| 2,997,843 | 8/1961 | Arnett et al. _____ 137—15.2 |
| 3,080,707 | 3/1963 | Vetter _____ 137—15.1 |

FOREIGN PATENTS 742,870  9/1966  Canada.

ROBERT G. NILSON, Primary Examiner